United States Patent [19]
Kolibar

[11] 3,733,655
[45] May 22, 1973

[54] FASTENER DEVICE

[76] Inventor: Richard W. Kolibar, 7265 Glenn Oval Drive, Parma, Ohio 44130

[22] Filed: Nov. 3, 1971

[21] Appl. No.: 195,227

[52] U.S. Cl. .................................. 24/73 P, 85/5 R
[51] Int. Cl. ............................................ A44b 21/00
[58] Field of Search ..................... 85/5, 80, DIG. 2; 16/2; 24/213 R, 208 A, 213 CS, 213 B, 73 R, 73 MF, 73 FT, 73 PF, 73 HS, 73 P, 73 D, 73 B, 73 PM, 73 AP

[56] References Cited

UNITED STATES PATENTS

| 2,627,094 | 2/1953 | Bedford | 24/213 B X |
| 2,665,927 | 1/1954 | Becker | 85/5 R X |
| 2,799,118 | 7/1957 | Lullo | 85/DIG. 2 UX |
| 2,909,957 | 10/1959 | Rapata | 85/5 R |
| 3,651,545 | 3/1972 | Hara | 24/73 P |

FOREIGN PATENTS OR APPLICATIONS

| 1,464,882 | 11/1966 | France | 24/73 AP |
| 979,470 | 1/1965 | Great Britain | 85/80 |
| 1,135,580 | 12/1968 | Great Britain | 24/73 AP |

*Primary Examiner*—Donald A. Griffin
*Attorney*—Howard D. Gordon

[57] ABSTRACT

A unitary, one-piece fastener device for detachably mounting a plurality of apertured panels in stacked, spaced relation including an elongated body adapted for insertion at either end through the apertures in the panels. The body includes a series of lengthwise spaced, cam-like abutments disposed for resilient camming and locking engagement with respective of the panels for detachably mounting the same in such stacked relation in the installed position thereof.

5 Claims, 3 Drawing Figures

PATENTED MAY 22 1973

3,733,655

INVENTOR.
RICHARD W. KOLIBAR
BY

3,733,655

FASTENER DEVICE

BACKGROUND OF THE INVENTION

The present invention relates to a fastener device for mounting a plurality of apertured support members, and more particularly relates to a fastener device for detachably mounting a plurality of apertured panels or the like in stacked, spaced relation with respect to one another. The fastener device of the present invention has particular application in mounting three or more apertured electrical components, such as printed circuit boards, panels or the like, in spaced, superposed or stacked relation by snap-action installation.

Heretofore, various types of fasteners have been employed for mounting a series of support members, such as panels or the like, in a stacked relation. However, difficulties have arisen in mounting a series of apertured panels in stacked and spaced apart relation with respect to one another, especially when it is required to mount three or more of such panels. Generally, such devices have been of a multi-part construction having either one or both ends relatively permanently affixed to a respective one of the parts. Such arrangements are not only expensive to produce and time consuming to install, but are difficult to remove from the assembly without damage or destruction, thereby preventing effective reuse of the fastener for repeated installations. Moreover, such devices do not provide a controllable "pull-out" force and hence, would require auxiliary equipment or tools to detach the parts for repeated usage of the fastener. In addition, such devices necessitate the use of various size hole openings in the panels resulting in the requirement to fabricate corresponding hole openings in the panels and/or to inventory a variety of fastener sizes. Further, such devices, other than the multi-part types, are generally constructed so as to be insertable only at one end through the panel hole opening resulting in an inefficient method of installation, especially when it is desired to mount three or more panels.

SUMMARY OF THE INVENTION

A unitary, one-piece fastener device adapted for mounting a plurality of apertured support members, such as panels or the like, in spaced, superposed relation with respect to one another comprising, an elongated body member made from a polymeric material adapted to be inserted at either end through the respective apertures in said support members, said body member including a resilient cam-like abutment means adjacent the opposed ends thereof, and at least one other resilient cam-like abutment means disposed between said ends for detachably mounting said support members in spaced, superposed relation by snap-action installation. In the form shown, the abutment means adjacent the opposed ends includes a pair of resilient body portions disposed on opposed sides of an aperture extending through said body, and cam-like abutment elements made integral with and extending outwardly from said body portions adapted for resilient inward and outward movement upon insertion of said body member through the respective aperture in an associated one of said support members. The other abutment means includes at least one other pair of resilient body portions disposed on opposed sides of an aperture extending through said body member, and with cam-like abutment elements made integral with and extending outwardly from said body portions adapted for resilient inward and outward movement upon insertion of said body member through the respective aperture in one of said support members for holding three or more support members in spaced, superposed relation with respect to one another in the installed position thereof.

From the foregoing, the following description and accompanying drawings, it will be seen that the present invention provides a novel fastener device which is of a unitary, one-piece construction which is relatively simple and economical to produce, but which is of a rugged high strength construction suitable for repeated usage. The fastener of the invention is of an elongated body construction capable of insertion at either end through the aperture in a panel or the like enabling the panels to be quickly and easily installed from either or both ends of the device, as desired. The device includes a novel arrangement of a plurality of lengthwise spaced resilient cam-like abutment means adapted for facile, snap-action installation and holding engagement with the panels, and which enables the panels to be fabricated with the same size hole openings for use with the fasteners of the invention. The resilient abutment means are constructed and arranged so as to provide a controllable "pull-out" force to provide optimum holding power between the parts, yet to facilitate disassembly of the fastener from the parts without damage or destruction thereof for repeated usage of the fastener. In the invention, the fastener device is preferably made from a polymeric material which has relatively high strength characteristics for maintaining the panels in spaced, superposed relation with respect to one another, yet which has sufficient resilient characteristics at the areas of the cam-like abutment means to enable snap-action installation of the fastener device with the apertured panels, and which provides a good insulation between such panels in the installed position thereof.

DESCRIPTION OF THE PREFERRED EMBODIMENTS

Figure 1:
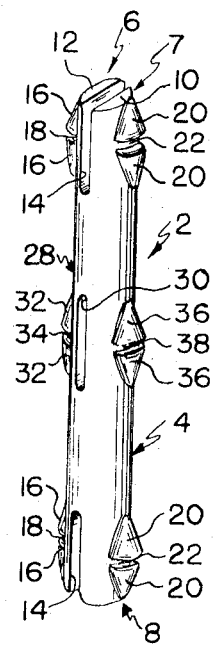
FIG. 1 is a generally perspective view of the fastener device made in accordance with the present invention.
Figure 2:
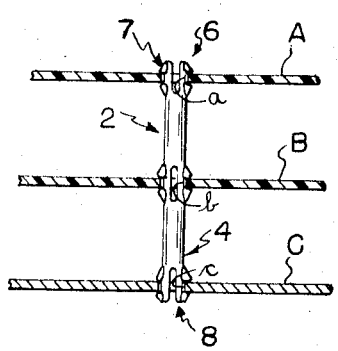
FIG. 2 is a fragmentary, front elevation view, on a reduced scale, and partly in section, illustrating the fastener device of the present invention in installed position for mounting a plurality of panels or the like in spaced, superposed relation.

Referring again to the drawings and in particular to FIGS. 1 and 2 thereof, there is illustrated the fastener device of the invention, designated generally at 2, which may be employed for mounting a plurality of support members or panels A, B and C in spaced, superposed or stacked relation with respect to one another. For example, the panels A and B may be printed circuit boards mounted on a frame or chassis C. Accordingly, though the device 2 has been illustrated for mounting three panels, it is to be understood that the principles of the invention can be employed for mounting any number of panels of varying sizes, as desired.

In general, the device 2 can be uniquely employed for mounting a series of apertured panels for the reason that, among other things, it can be installed from either end thereof. In use, for example, the middle panel B may first be installed from either end of the device 2, whereupon, the other two remaining panels A and C may then be installed adjacent the opposite ends, all by means of a quick and positive snap-action attachment, as will hereinafter be more fully described.

As best illustrated in FIG. 1, the device 2 includes an elongated body member, designated generally at 4, of unitary one-piece construction having opposed leading or pilot-like end portions 6 and 8, either of which can be inserted through the apertures or hole openings (a, b, c,) provided in the respective panels A, B, and C, as best seen in FIG. 2. In the form shown, the body member 4 is of a cylindrical construction adapted to be inserted through corresponding circular openings in the respective panels. It is to be understood, however, that the body member may be constructed in other shapes which are non-circular, such as polygonal shapes including, for example, square, rectangular or the like.

In the invention, the respective lead end portions 6 and 8 of the body member 4 are generally of an identical construction so that the following description will proceed with respect to the end portion 6, for example, wherein like reference characters have been applied to like parts for convenience of illustration. In the embodiment shown, the end portion 6 is provided with a support or cam-like abutment means, designated generally at 7, for snap-action and interlocking engagement with a respective one of the apertured panels. Preferably, the abutment means 7 is of a bifurcated construction defined by an elongated linearly extending aperture or kerf-like slot 14 which opens onto the respective end thereof. The slot 14 defines a pair of oppositely disposed resilient body portions in the form of tongues 10 and 12 which extend parallel to the slot 14 and which constitute integral extensions of the body member 4. By this arrangement, the resilient tongues 10 and 12 can move inwardly and outwardly with respect to one another upon application of force to the exterior surfaces thereof upon installation with a respective one of the panels upon insertion of either end of the body member 4 into the respective aperture of the panel.

Figure 3:
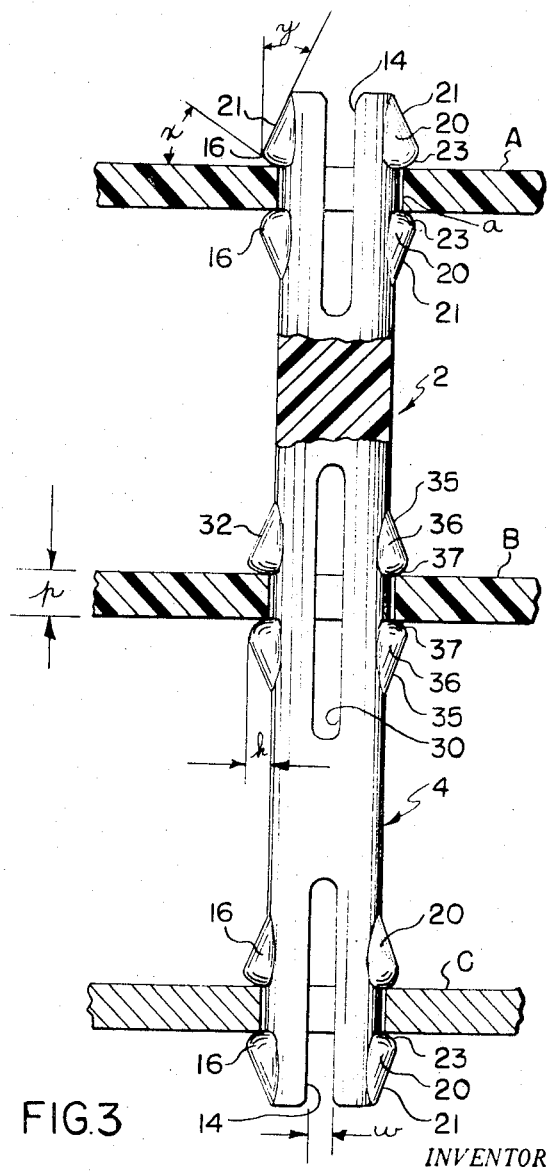
FIG. 3 is a fragmentary, front elevation view, on an enlarged scale and partly in section, illustrating in greater detail the construction of the fastener device of the present invention and its interaction with the panels in such installed position thereof.

As best seen in FIGS. 1 and 3, each of the tongues 10 and 12 is provided with a pair of oppositely disposed abutment elements in the form of nibs or protuberance elements 16 and 20 made integral therewith and extending outwardly therefrom. The elements 16 and 20 are preferably disposed lengthwise of the body member 4 and are spaced apart, as at 18 and 22, a distance sufficient to receive the maximum thickness ($p$) of the panel therebetween. Preferably, the distance between opposed of the element pairs 16 and 20 is the same (i.e., ratio 1:1) to that of the maximum thickness of the panel or the distance may be slightly less than the thickness of the panel so as to provide a biting or gripping engagement of the marginal edges of the opening of the panel with the confronting surfaces of the respective elements in the installed position thereof. As shown, the elements of each pair 16 and 20 are generally of a frusto-conical configuration having inclined or tapered ramp-like cam surfaces 21 which extend generally linearly and which fall abruptly into curved abutment shoulders 23 (FIG. 3) which provide an overlying locking action on the confronting marginal surfaces of the respective panel in the installed position. Preferably, the elements are provided with a ramp angle ($y$) which is sufficient to facilitate insertion of the lead end 6 of the body member through the respective panel opening and to enable the panel to ride-up and over the ramp surfaces upon resilient inward movement thereof so that the panel thickness can be seated in the recess space between the respective shoulders 23 of the elements. Preferably, the abutment angle ($x$) of the shoulders 23 is sufficient to provide a positive holding engagement with the confronting marginal edges of the panel and is preferably curved so as to enable the panel to ride-up and over the shoulders to facilitate removal without damage to the elements.

To provide good resilient inward and outward movement of the tongues 10 and 12 with respect to one another and to provide optimum cam action and holding engagement with the panel, it is preferred that the slot 14 have a lengthwise dimension so as to extend slightly beyond the respective pairs of elements 16 and 20, as best seen in FIG. 3. Accordingly, it is preferred that the width ($w$) of the slots 14 be proportioned in relation to the maximum height ($h$) of each of the respective elements to provide an optimum controllable "pull-out" force between the parts. For example, it has been found that the proportions should be in the ratio range from 1:1 to 3:1 with a range of 2:1 being preferred. In the embodiment shown, for example, the element pairs 16 and 20 each have a maximum height $h$ equal to approximately one-half the width of the slot 14 so as to give a ratio of ($w$) : 2 ($h$) or 1:1. Further, in the embodiment shown, it is preferred that the length of the slots 14 be greater than the combined lengths of each of the element pairs 16 and 20 and the thickness of the panel so as to extend slightly beyond the innermost pair of elements, as aforesaid.

In the invention, the body member 4 is provided between its opposed leading ends 6 and 8 with one or more support or cam-like abutment means, designated generally at 28, so as to enable the device to support three or more apertured panels in spaced, superposed relation with respect to one another, as desired. In the embodiment shown, the abutment means 28 is generally similar to that of the abutment means 7 at the opposed ends of the body member 4, except that in this case an elongated linear extending aperture or kerf-like slot 30 is provided which may have a slightly greater length as compared to the slots 14 and is completely confined by the material of the body member 4. Here again, the resilient body portions defined by the slot 30 are provided with opposed pairs of abutments or cam-like protuberance elements 32 and 36 made integral therewith and extending outwardly therefrom. The element pairs 32 and 36 are spaced apart, as at 34, 38, so as to accommodate the thickness ($p$) of a respective one of the apertured panels therebetween. Accordingly, the respective slots 14 and 30 are preferably of the same width and are disposed in aligned parallel relationship with respect to one another so that their longitudinal axes are coincident with the longitudinal central axis of the body member 4. Accordingly, it will be seen that any number of the abutment means 28 may be provided with variation in the axial spacement therebetween so as to accommodate and mount any number of panels in a predetermined spaced, superposed relation, as desired.

In the invention, the body member 4 may have a maximum transverse dimension (i.e., diameter) which is approximately the same as or slightly less than the corresponding maximum dimension (i.e., diameter) of the apertures or openings ($a$, $b$, $c$) provided in the respective panels. In this regards, it is to be understood, however, that in the event the body member 4 were formed in some other non-circular shape that the apertures or holes in the panels would be formed in a corresponding shape. Moreover, the respective cam-like element pairs 16, 20, 32, and 36, for example, would be similarly shaped to correspond to the shape of the body member and hence, to the shape of the aperture or opening to which the device is to be applied for a given mounting application.

In the invention, it is preferred that the fastener device be made from a relatively high strength material having good electrical insulating characteristics, but which provides the necessary resilient characteristics for snap-action mounting of the panels. For example, it is preferred that the device be made from a polymeric material, such as plastic materials including nylon or the like, and relatively hard rubbers or the like.

In a typical application, one of the panels, such as B, may first be installed by inserting one of the end portions, as at 6, through the associated aperture or opening ($b$) in the panel so that the confronting marginal edges of the panel opening ride-up along the ramp surfaces 21 of the opposed cam-like elements 16 and 20 which causes the tongues 10 and 12 to resiliently bias inwardly toward one another. Continued movement between the parts causes the marginal edges of the panel opening to pass up and over the high points on the cam surfaces until the panel drops into place in the recess opening, as at 18 and 22, between the element pairs, whereupon, the tongues then move resiliently apart for snapping the shoulders 23 in overlying engagement with the marginal edges of the panel. Further movement of the panel causes the marginal edges to ride-up and over the curved surfaces of the shoulders 23 to again bias the tongues 10 and 12 inwardly to enable the panel to clear the first abutment means 7. The panel is then moved in a direction toward the next successive abutment means, as at 28, where the camming and snap-action interlocking engagement is repeated for finally seating the panel in secured position between the respective cam element pairs 32 and 36. Here again, the ramp surfaces 35 and shoulders 37 coact in a similar manner with the confronting marginal edges of the opening in the panel to enable initial resilient inward movement of the body portions and then resilient outward movement of such portions to provide an efficient snap-action securement with the panel. After the first panel is installed, the other panels, such as A and C, may then be installed in a similar manner at the opposed ends 6 and 8 of the body member 4 to complete the assembly. Accordingly, by this arrangement it will be seen that the fastener device is constructed and arranged to enable any number of panels with a single sized hole opening to be mounted from either end of the fastener device or for quick and efficient removal therefrom in a similar manner, as desired.

I claim:

1. A unitary fastener mounting a plurality of panels having like-sized apertures through which said fastener extends in spaced, generally-superposed relation, said fastener comprising:
   an elongated body member of polymeric material having a plurality of elongated, axially-extending spaced slots extending therethrough;
   a set of protuberances for each slot extending from the surface of said member and axially-extending a distance less than that of said slots;
   each set having at least two protuberances with one protuberance spaced on one side of said slot and the other protuberance on the other side of said slot and each protuberance in each set axially-spaced from one another a distance corresponding to the thickness of said plates whereby said panels are mounted by the fastener; and
   said body member having a cross-sectional configuration between said protuberance sets generally conforming to said apertures in said panels.

2. The fastener as defined in claim 1 wherein each protuberance includes an outwardly-tapered ramp-like surface and a cam-like surface extending inwardly from said ramplike surface toward said body member, the intersection of said ramp-like surface with said cam-like surface defining the maximum height of each protuberance, said maximum height being not less than one-third the width of said slot.

3. The fastener as defined in claim 2 wherein said maximum height is not greater than said slot width.

4. The fastener as defined in claim 1 wherein each axial end of said body member coincides with an end of a protuberance set to define bifurcated axial-end portion constructions in said elongated member.

5. A unitary fastener for mounting a plurality of panels having like-sized apertures through which said fastener extends in spaced, generally-superposed relation, said fastener comprising:
   an elongated body member of polymeric material having a plurality of elongated, axially-extending slots extending there-through, said slots spaced to define bifurcated axial end portion constructions in said elongated member with at least one slot interposed said end portions;
   a set of protuberances for each slot extending from the surface of said member and axially-extending a distance less than that of said slots;
   each set defined by a first pair of aligned protuberances disposed on opposite sides of said slot, a second pair of aligned protuberances disposed on opposite sides of said slot, said first and second pairs spaced apart a predetermined distance for mounting a panel between said pairs; and
   each protuberance defined by an outwardly-tapered ramp-like surface and a cam-like surface extending inwardly from said ramp-like surface toward said body member.

* * * * *